US010645792B2

United States Patent
Zhan et al.

(10) Patent No.: US 10,645,792 B2
(45) Date of Patent: May 5, 2020

(54) TARGET DEVICE FOR NEUTRON GENERATING DEVICE, ACCELERATOR-EXCITED NEUTRON GENERATING DEVICE AND BEAM COUPLING METHOD THEREOF

(71) Applicant: INSTITUTE OF MODERN PHYSICS, CHINESE ACADEMY OF SCIENCES, Gansu (CN)

(72) Inventors: Wenlong Zhan, Gansu (CN); Lei Yang, Gansu (CN); Hushan Xu, Lanzhou (CN)

(73) Assignee: Institute of Modern Physics, Chinese Academy of Sciences, Gansu (CN)

(*) Notice: Subject to any disclaimer, the term of this patent is extended or adjusted under 35 U.S.C. 154(b) by 1076 days.

(21) Appl. No.: 14/415,471

(22) PCT Filed: Mar. 4, 2013

(86) PCT No.: PCT/CN2013/072132
§ 371 (c)(1),
(2) Date: Jan. 16, 2015

(87) PCT Pub. No.: WO2014/134775
PCT Pub. Date: Sep. 12, 2014

(65) Prior Publication Data
US 2015/0181689 A1    Jun. 25, 2015

(51) Int. Cl.
*G21C 3/00* (2006.01)
*H05H 6/00* (2006.01)
(Continued)

(52) U.S. Cl.
CPC ............... *H05H 6/00* (2013.01); *G21C 3/62* (2013.01); *G21K 5/04* (2013.01); *G21K 5/08* (2013.01); *H05H 3/06* (2013.01); *G21G 4/04* (2013.01)

(58) Field of Classification Search
CPC .......... G21G 1/00; G21G 1/0005; G21G 1/02; G21G 1/04; G21B 1/00; G21B 1/11; G21B 1/19
See application file for complete search history.

(56) References Cited

U.S. PATENT DOCUMENTS

| 4,597,936 A | 7/1986 | Kaae |
| 2004/0000637 A1 | 1/2004 | Wieland |
| 2009/0213977 A1* | 8/2009 | Russell, II ............... G21G 1/02 376/170 |

FOREIGN PATENT DOCUMENTS

| CN | 1424726 A | 6/2003 |
| CN | 101516157 A | 8/2009 |

(Continued)

OTHER PUBLICATIONS

Office Action, dated Mar. 16, 2016 in counterpart Japanese Patent Application No. 2015-521946.
(Continued)

*Primary Examiner* — Marshall P O'Connor
(74) *Attorney, Agent, or Firm* — Steven McMahon Zeller; Dykema Gossett PLLC (57) ABSTRACT

A target device for a neutron generating device, an accelerator-excited neutron generating device, and a beam coupling method thereof are disclosed. The target device comprises a plurality of solid particles serving as a target body; and a target body reaction chamber for accommodating the solid particles. With the accelerator-excited neutron generating device and the beam coupling method according to the present invention, the solid particles which are being circulated and situated outside the target body reaction chamber are processed, thereby overcoming defects in the prior art such as low-efficiency heat exchange, a short life time, a bad stability and a narrow application range, and achieving the
(Continued)

advantages of high-efficiency heat exchange, a long life time, a good stability and a wide application range.

16 Claims, 4 Drawing Sheets

(51) Int. Cl.
  *H05H 3/06* (2006.01)
  *G21C 3/62* (2006.01)
  *G21K 5/04* (2006.01)
  *G21K 5/08* (2006.01)
  *G21G 4/04* (2006.01)

(56) References Cited

FOREIGN PATENT DOCUMENTS

| | | | |
|---|---|---|---|
| CN | 101562058 | A | 10/2009 |
| CN | 102374999 | A | 3/2012 |
| CN | 102893339 | A | 1/2013 |
| JP | 11-133199 | A | 5/1999 |
| JP | 2009198500 | A | 9/2009 |
| JP | 2013084393 | A | 5/2013 |
| JP | 2013084394 | A | 5/2013 |
| RU | 2282909 | C2 | 8/2006 |

OTHER PUBLICATIONS

English Translation of Office Action, dated Mar. 16, 2016 in counterpart Japanese Patent Application No. 2015-521946.
Office Action, dated Oct. 6, 2015 in counterpart Japanese Patent Application No. 2015-521946.
English Translation of Office Action, dated Oct. 6, 2015 in counterpart Japanese Patent Application No. 2015-521946.
Office Action, dated Jun. 30, 2015, SIPO of China in counterpart Chinese Patent Application No. 201310068408.8.
English Translation, Office Action, dated Jun. 30, 2015, SIPO of China in counterpart Chinese Patent Application No. 201310068408.8.
Guo, Zhong-yan, et al. Design on PET in Heavy Ion Cancer Therapy, Institute of Modern Physics, Chinese Academy of Sciences, May 31, 2006.
International Search Report (Chinese and English).
Written Opinion of International Search Report (Chinese).
English Translation of Written Opinion of International Search Report.

* cited by examiner

TARGET DEVICE FOR NEUTRON GENERATING DEVICE, ACCELERATOR-EXCITED NEUTRON GENERATING DEVICE AND BEAM COUPLING METHOD THEREOF

BACKGROUND OF THE INVENTION

1. Field of the Invention

The present invention relates to a target device for a neutron generating device, an accelerator-excited neutron generating device, and a beam coupling method thereof.

2. Description of the Related Art

Heat exchange between a cooling medium and a solid target material is main factor that restricts the development of the neutron generating device. With the continual increase in the beam power of the accelerator, the solid target has been unable to meet the requirements for operation of the target. The current solid targets generally operate under the conditions of less than one MW beam coupling.

SUMMARY OF THE INVENTION

The present invention has been made in view of the above problems. An object of the present invention is to provide a target device for a neutron generating device, an accelerator-excited neutron generating device, and a beam coupling method thereof, thereby solving the technical problem of for example selection of a movable thermal medium and removing of heat when beam bombardment is carried out.

Another object of the present invention is to provide a beam coupling method of an accelerator-excited neutron generating device, thereby solving for example the technical problem that the existing target devices cannot be used in a high-power beam for a long period of time.

In accordance with an aspect of the present invention, there is provided a target device for a neutron generating device, the target device comprising a plurality of solid particles serving as a target body; and a target body reaction chamber for accommodating the solid particles.

In accordance with an aspect of the present invention, the solid particles have at least one of a spherical shape, an ellipsoidal shape, and a polyhedral shape.

In accordance with an aspect of the present invention, the solid particle comprises anyone of tungsten, a tungsten alloy, uranium, a uranium alloy, uranium ceramics, thorium, a thorium alloy, and thorium ceramics.

In accordance with an aspect of the present invention, the target body reaction chamber has an injection conduit defining an injection opening and a discharge conduit defining a discharge opening, and the solid particles are injected into the target body reaction chamber through the injection opening and moved out of the target body reaction chamber through the discharge opening.

In accordance with an aspect of the present invention, a ratio of a diameter of the target body reaction chamber to a particle diameter of the plurality of solid particles is in a range of 5:1-30:1; and/or a ratio of a caliber of the injection conduit to the diameter of the target body reaction chamber is in a range of 1:1-1:10; and/or a ratio of a caliber of the discharge conduit to the diameter of the target body reaction chamber is in a range of 1:1-1:10.

In accordance with an aspect of the present invention, there is provided an accelerator-excited neutron generating device comprising a target body reaction chamber for accommodating solid particles serving as a target body; and a solid particle conveying device for injecting the solid particles into the target body reaction chamber.

In accordance with an aspect of the present invention, the accelerator-excited neutron generating device further comprises a cooling device, wherein the solid particles are cooled by the cooling device after the solid particles are moved out of the target body reaction chamber, and then the solid particles are injected into the target body reaction chamber by the solid particle conveying device.

In accordance with an aspect of the present invention, the accelerator-excited neutron generating device further comprises a sorting device configured such that those of the solid particles that conform to a predetermined standard are selected from the solid particles by the sorting device after the solid particles are moved out of the target body reaction chamber, and then injected into the target body reaction chamber. The predetermined standard may be a particle size of the solid particles, other quality indexes, or the like. The indexes can be detected by means of various detection devices.

In accordance with an aspect of the present invention, the solid particles have at least one of a spherical shape, an ellipsoidal shape, and a polyhedral shape.

In accordance with an aspect of the present invention, the accelerator-excited neutron generating device further comprises a buffer chamber disposed at at least one of a solid particle injection opening and a solid particle discharge opening for temporarily storing the solid particles.

In accordance with an aspect of the present invention, the solid particle conveying device is configured to circulate the solid particles from an inside of the target body reaction chamber through an outside of the target body reaction chamber to the inside of the target body reaction chamber while the beam is applied to the solid particles.

In accordance with an aspect of the present invention, the accelerator-excited neutron generating device further comprises a cooling device and a sorting device, wherein the solid particles which are being circulated and situated outside the target body reaction chamber are cooled by the cooling device, and those of the solid particles that conform to a predetermined standard are selected by the sorting device from the solid particles which are being circulated and situated outside the target body reaction chamber.

In accordance with an aspect of the present invention, there is provided a beam coupling method for an accelerator-excited neutron generating device, the method comprising: injecting solid particles serving as a target body into a target body reaction chamber, and applying a beam to the solid particles.

In accordance with an aspect of the present invention, circulating the solid particles from an inside of the target body reaction chamber through an outside of the target body reaction chamber to the inside of the target body reaction chamber while the beam is applied to the solid particles.

In accordance with an aspect of the present invention, the solid particles which are being circulated and situated outside the target body reaction chamber are processed.

In accordance with an aspect of the present invention, the processing comprises cooling the solid particles and selecting those of the solid particles that conform to a predetermined standard from the solid particles.

In accordance with an aspect of the present invention, the beam coupling method may be a low-power beam coupling method for an accelerator-excited neutron generating device, or a high-power beam coupling method for an accelerator-excited neutron generating device.

According to some embodiments of the present invention, the present invention can solve the exiting technical problem of removing heat from a target device during high-power beam bombardment, thereby achieving the advantages of high-efficiency heat exchange, a long life time, a good stability and a wide application range.

Other features and advantages of the application will be set forth in part in the description which follows and, in part, will be obvious from the description, or may be learned by practice of the application.

The present invention will be further described in detail by means of the accompanying drawings and embodiments.

BRIEF DESCRIPTION OF THE DRAWINGS

The drawings are used to provide further understanding of the present invention and constitute a part of the description. The present invention is further explained by means of the drawings together with the embodiments of the present invention and should not be construed as being limited to the drawings and embodiments. In the accompanying drawings.

The reference numerals in the drawings are listed as follows:

11: target body reaction chamber; 12: solid particle injection section; 13: solid particle discharge section; 14: proton beam input conduit; 15: beam scanning and security protecting device; and 16: solid particle.

DETAILED DESCRIPTION OF THE EMBODIMENTS

The preferable embodiments of the present invention will now be described with reference to the accompanying drawings. It should be understood that the preferable embodiments set forth herein are only used to describe and explain the present invention and the present invention is not limited to the embodiments.

Device Embodiment

Figure 1:
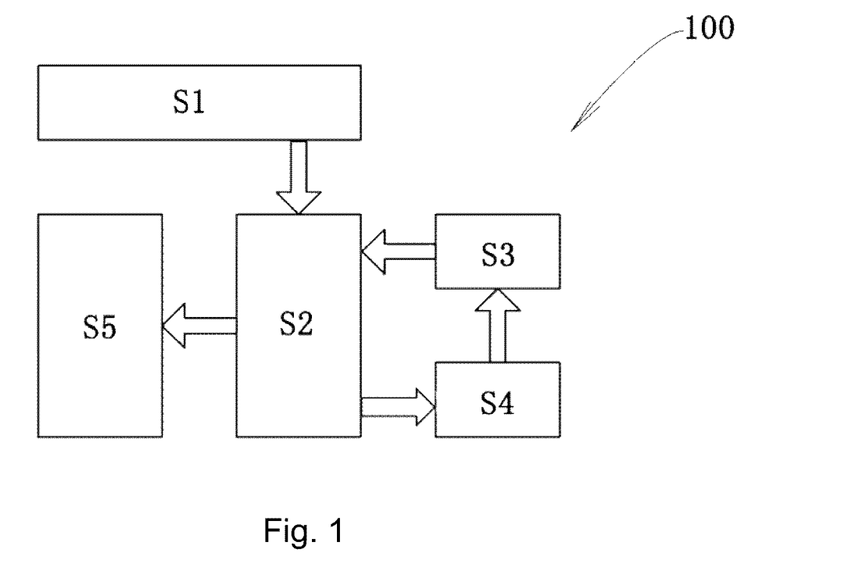
FIG. 1 is a block diagram of an accelerator-excited neutron generating device according to an embodiment of the present invention.
Figure 2:
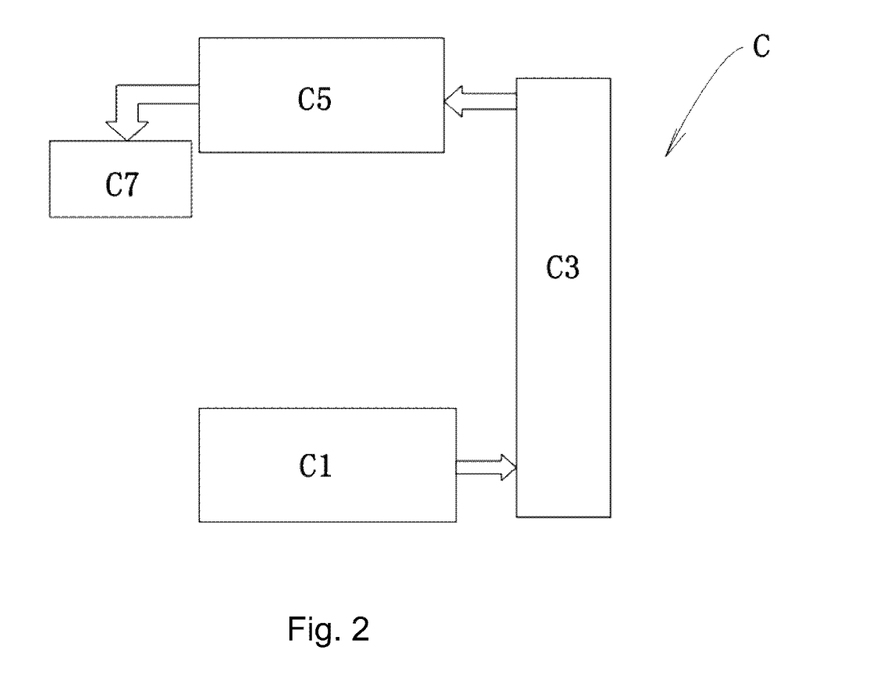
FIG. 2 is a block diagram of an off-line system of an accelerator-excited neutron generating device according to an embodiment of the present invention.
Figure 3:
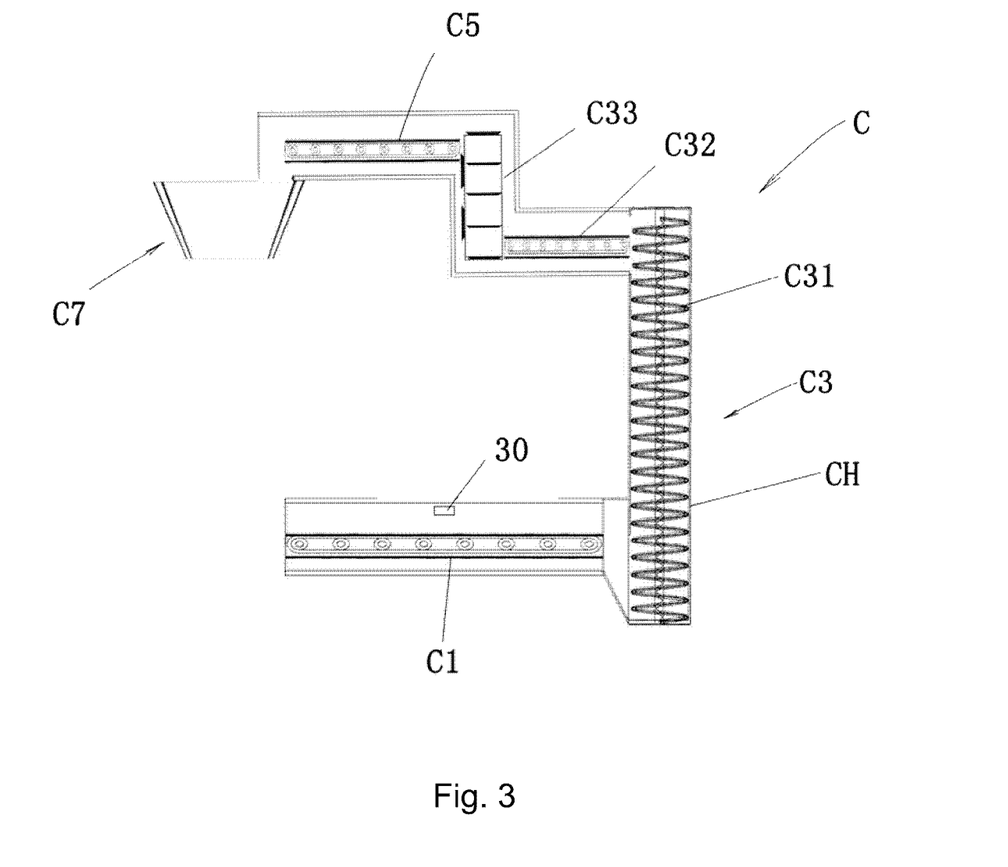
FIG. 3 is a schematic view of the off-line system of the accelerator-excited neutron generating device according to the embodiment of the present invention.

As shown in FIGS. 1-3, an accelerator-excited neutron generating device 100 according to an embodiment of the present invention comprises a first subsystem S1, a second subsystem S2, a third subsystem S3, a fourth subsystem S4, and a fifth subsystem S5.

The first subsystem S1 is an accelerator system for providing an accelerator incident beam. The distribution of the beam may be set to a uniform distribution, a Gaussian-like unimodal distribution or bimodal distribution, or the like according to requirements. The energy level of the particle beam may be in a range of 100 MeV to several GeV. The beam intensity is dependent upon a neutron intensity required for a neutron source. The beam intensity may be any value between 0.1 mA and several hundred mA. The first subsystem S1 may comprise components such as a beam bending magnet, and a beam vacuum protection system. Any known accelerator system may be adopted as the accelerator system serving as the first subsystem S1.

Figure 4:
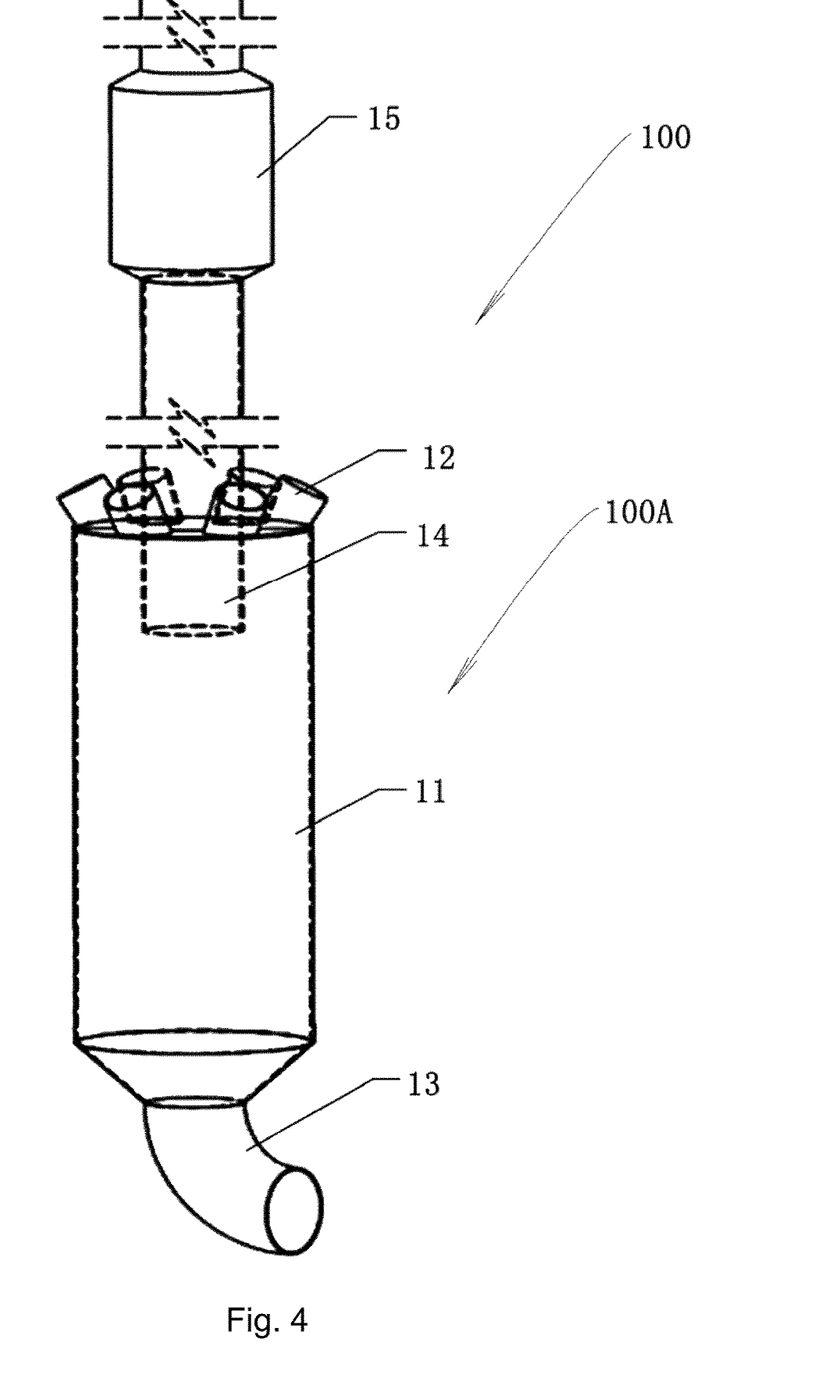
FIG. 4 is a schematic view showing a structure of a target body according to an embodiment of the present invention.
Figure 5:
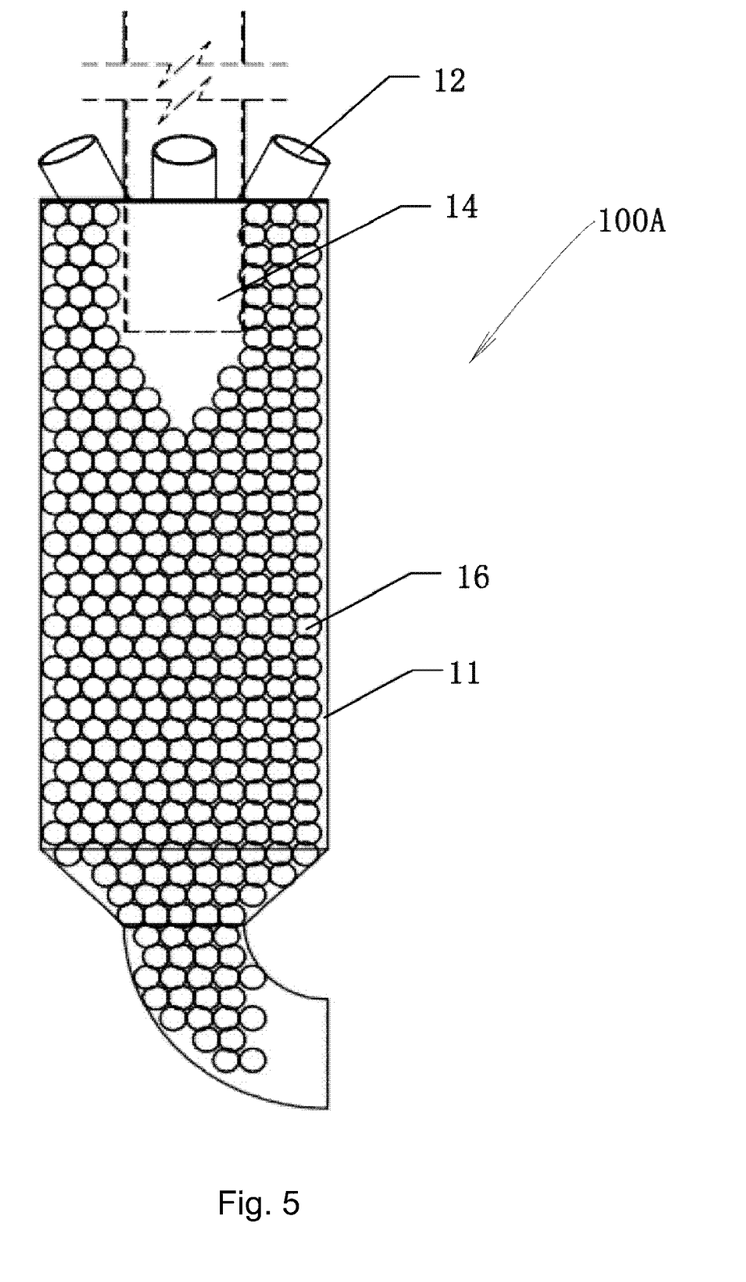
FIG. 5 is a schematic view showing structures of a target body reaction chamber and solid particles in the target body according to an embodiment of the present invention.

The second subsystem S2 is an target device 100A for the neutron generating device (shown in FIGS. 4 and 5). The target device 100A composes a target body reaction chamber 11 and solid particles 16. The target body consisting of solid particles 16 is bombarded with the incident beam so that primary spallation reaction and cascade reaction occurs in the reaction chamber 11 to generate a great deal of neutrons. At one end of the target body reaction chamber 11, a solid particle injection section 12 is disposed. The solid particle injection section 12 may be coupled with the third subsystem S3 for temporarily storing the solid particles 16 so that the solid particles 16 will be inputted from the third subsystem S3 into the solid particle injection section 12. At the other end of the target body reaction chamber 11, a solid particle discharge section 13 is disposed. The solid particle discharge section 13 may be coupled to the fourth subsystem S4. The fourth subsystem S4 is used for temporarily storing the solid particles 16.

The third subsystem S3 may comprise a solid particle conveying device and a sorting device. In the third subsystem S3, the solid particles will be inspected and will be separated according to conditions.

The fourth subsystem S4 is a system for storing the solid particles temporarily and may comprise a solid particle conveying device, a heat exchanger and the like. In the fourth subsystem, the solid particles will be cooled by the heat exchanger.

The fifth subsystem S5 is a neutron applying system and can receive neutrons transmitted from the second subsystem S2 and perform various possible applications of the neutrons such as power generation.

Particles of the incident beam may be selected from particles such as protons, deuterium ions, tritium ions, and helium ions. An incident direction of the beam is the same as an axial direction of the chamber. The main part of the target body is the solid particles. A metal material such as tungsten or a tungsten alloy, or uranium, a uranium alloy or uranium ceramics, or thorium, thorium alloy or thorium ceramics may be selected for the main material of the solid particles according to requirements for spallation neutrons to generate more neutrons. The solid particles have at least one of a spherical shape, an ellipsoidal shape, and a polyhedral shape. The solid particles may have any other appropriate shape.

As shown in FIGS. 3-5, the accelerator-excited neutron generating device 100 according to the embodiment comprises the target body reaction chamber 11 for accommodating the solid particles, an accelerator system and security protecting device 15, a proton beam input conduit 14 connected between a central portion of the target body reaction chamber 11 and a central portion of the accelerator system and security protecting device 15, and an off-line processing system C cooperating with the target body reaction chamber 11. The off-line processing system C comprises a solid particle conveying device for injecting the solid particles into the target body reaction chamber. As shown in FIGS. 1-2, the third subsystem S3 and the fourth subsystem S4 shown in FIG. 1 constitute the off-line system C shown in FIG. 2. The system is used for circulating the solid particles 16 from an inside of the target body reaction chamber through an outside of the target body reaction chamber to the inside of the target body reaction chamber. The off-line processing system C may further comprise a housing CH.

As shown in FIGS. 3-5, the solid particle conveying device comprises a first solid particle conveying device C1 disposed substantially horizontally. The solid particles 16 may be discharged from the target body reaction chamber 11 to fall onto the first solid particle conveying device C1. The off-line processing system C may further comprise a cooling device 30. The solid particles are cooled by the cooling device after the solid particles are moved out of the target body reaction chamber, and then the solid particles are injected into the target body reaction chamber by the solid particle conveying device. For example, the cooling device 30 is an air blower to cool the solid particles 16. In addition, the first solid particle conveying device C1 may also be submerged in liquid, thereby cooling the solid particles 16 while the solid particle conveying device C1 conveys the solid particles 16. Furthermore, the off-line processing system C may further comprise a sorting device, such as a drum screen, for screening out cracked solid particles. The solid particle 16 may be discharged from the target body reaction chamber 11 and fall into the sorting device. The sorting device is configured such that those of the solid particles that conform to a predetermined standard are selected from the solid particles by the sorting device after the solid particles are moved out of the target body reaction chamber 11, and then injected into the target body reaction chamber 11. The predetermined standard may be a particle size of the solid particles, other quality indexes, or the like. The indexes can be detected by means of various detection devices.

In addition, the cooling device 30 and the sorting device may be disposed at any appropriate portions of the off-line processing system C. If the target body reaction chamber 11 is not uprightly disposed, for example, the target body reaction chamber 11 is horizontal disposed, an upright conveyer such as a screw conveyer or a pickup device (for example, a mechanical arm or a robot) may be used to load the solid particles 16 to the first solid particle conveying device C1 or the sorting device.

In addition, in some embodiments, the neutron generating device may not include the cooling device and the sorting device. For example, heat may dissipate from the solid particles on the conveying device, and less cracked or fragmentized particles are generated in the solid particles. In addition, when the neutron generating device operates at a low power, the neutron generating device may not include the cooling device.

As shown in FIGS. 2-3, the solid particle conveying device further comprises a second solid particle conveying device C3 as an upright lifting and conveying device. The second solid particle conveying device C3 comprises a screw conveyer C31 for upright conveying the solid particles, a horizontal conveying device C32, and a pneumatic lift C33. The solid particle conveying device further comprises a third solid particle conveying device C5.

The first solid particle conveying device C1, the horizontal conveying device C32, and the third solid particle conveying device C5 may be any appropriate conveyers such as a chute for conveying the solid particles with gravity, a scraper conveyor, or a belt conveyor.

In addition, the solid particles may be discharged from the target body reaction chamber 11 with gravity and may fall directly onto the first solid particle conveying device C1.

The target body reaction chamber 11 may have a substantially cylindrical shape or any other appropriate shape. For example, the target body reaction chamber may have an elliptical cross section.

An included angle between an axis of the target body reaction chamber 11 and a horizontal plane may be larger than 0 degree and less than or equal to 90 degrees. In other words, the target body reaction chamber may be disposed generally horizontally or may be disposed vertically. A ratio of an axial or longitudinal size of the target body reaction chamber 11 to a radial size (diameter) or a transverse size of the target body reaction chamber is in a range of 3:1-10:1, and can be adjusted according to the beam intensity. A ratio of a diameter or particle diameter of each of the solid particles to the radial size (diameter) or the transverse size of the target body reaction chamber is in a range of 5:1-30:1. A ratio of a caliber of an injection conduit 12 of each of a plurality of solid particle injection sections to the radial size (diameter) or the transverse size of the target body reaction chamber is in a range of 1:1-1:10. A ratio of a caliber of a discharge conduit 13 of a solid particle discharge section to the radial size (diameter) or the transverse size of the target body reaction chamber is in a range of 1:1-1:10. The material of the solid particles can be selected from at least anyone of tungsten, a tungsten alloy, uranium, a uranium alloy, uranium ceramics, thorium, a thorium alloy, and thorium ceramics. The diameter or particle size of the solid particle is between an order of submillimeter and an order of several centimeters. The specific diameter or particle size of the solid particle is determined according to the radial size of the target body reaction chamber.

The accelerator system is used to control a transverse distribution of the beam bombarding the solid particles. The accelerator system scans in a predetermined manner so that heat is distributed uniformly. The security protecting device 15 is used for preventing leakage of pressurized gas in the direction of the accelerator in an accidental state and ensures that the accelerator beam conduit is in a vacuum range for operation.

As shown in FIGS. 2-3, the off-line system C comprises a buffer chamber C7 disposed at a corresponding injection opening 12 of the solid particle injection section. The sorting system is configured such that before the solid particles are injected, they are inspected and separated by the sorting system according to preset conditions. The qualified solid particles are conveyed to the buffer chamber C7. For example, the solid particles having a predetermined particle size is selected and the cracked solid particles are screened out. The screw conveyer C31 has the function of both sorting and dust removing and the pneumatic lift C33 has the function of both sorting and dust removing.

The buffer chamber C7 may have substantially a funnel shape and is used for temporarily storing the solid particles.

In the accelerator-excited neutron generating device according to the above embodiment, the target body in the target body reaction chamber 11 is composed of the solid particles. When the target body is bombarded with the beam, it will generate a high-flux neutron flow.

The material of the solid particles is selected from tungsten, a tungsten alloy, uranium, a uranium alloy, uranium ceramics, thorium, a thorium alloy, thorium ceramics, and other materials having required characteristic. The characteristic of the material of the solid particles is high-temperature resistance, high heat capacity, high neutron yield and the like. The solid particles are placed in the target body reaction chamber. The solid particles enter the solid particle injection section through the buffer chamber and are injected into the reaction chamber from the injection section. The solid particle discharge section functions to move the solid particles in which high-power energy is deposited from the reaction chamber and convey the solid particles to the heat exchange system for removing the high-power deposited energy. The heat exchange system for the solid particles functions to remove the high-power deposited energy from the solid particles.

The solid particle conveying device and the sorting system are disposed between the solid particle injection section and the heat exchange system. In the solid particle conveying device and the sorting system, the solid particles will be inspected and will be separated according to conditions. The beam input conduit functions to provide an input conduit for the beam from the accelerator and guide the beam into the device. Particles of the incident beam may be particles such as protons, deuterium ions, tritium ions, or helium ions. An incident direction of the beam is the same as an axial direction of the chamber. In the beam scanning and security protecting device, the beam scanning device can control a transverse distribution of the beam bombarding the solid particles, and scan in a predetermined manner so that heat is distributed uniformly; and the security protecting device can prevent leakage of pressurized gas in the direction of the accelerator in an accidental state of the device and ensure that the accelerator beam conduit is in a vacuum range for operation.

At both ends of the target body reaction chamber, the solid particle injection section and the solid particle discharge section are disposed, respectively. The target body reaction chamber is provided with a plurality of solid particle injection section ports or interfaces. A user can select the number of the ports or interfaces to carry out connection according to specific requirements. The buffer chamber C7 may be an annular chamber fitted over an outer periphery of the beam conduit. The injection openings of the target body reaction chamber 11 may be initially closed. The third solid particle conveying device C5 such as a belt conveyor first injects the solid particles into the buffer chamber C7. The solid particles are poured into the buffer chamber C7 so that the level of the solid particles reaches a certain height, and then the injection opening of the target body reaction chamber 11 is opened. The number of the opened injection openings of the target body reaction chamber 11 is determined according to parameters such as the beam intensity and can be controlled during operation. After the injection opening of the target body reaction chamber 11 is opened, the solid particles fall into the injection opening of the target body reaction chamber 11 under the action of gravity, or under the action of gravity and by being driven with a gas. For example, a gas blowing opening may be disposed above the buffer chamber C7 so that the solid particles fall into the injection opening of the target body reaction chamber 11. The speed at which the solid particles are injected and discharged is determined by means of the number of the opened injection openings, thereby ensuring that a predetermined amount of the solid particles are retained in the target body reaction chamber 11.

Referring to FIGS. 1, in a specific example of the present invention, an body of the accelerator-excited neutron generating device comprises the target body reaction chamber 11, the solid particle injection section 12, the solid particle discharge section 13, the proton beam input conduit 14, and the beam scanning and security protecting device 15.

The target body reaction chamber 11 is connected at a lower portion to the solid particle discharge section 13, and at an upper portion to the solid particle injection section 12. In addition, the proton beam input conduit 14 is also connected to the solid particle injection section 12 and the central portion of the target body reaction chamber 11, and the proton beam input conduit 14 is connected to the beam scanning and security protecting device at a position away from the target body reaction chamber 11. The target device is provided with a plurality of solid particle injection section ports or interfaces. A user can select the number of the ports or interfaces to carry out connection according to specific requirements for injecting the solid particles into the target body reaction chamber. The primary spallation reaction and cascade reaction of the injected solid particles with the beam occur in the target body reaction chamber 11 to generate a great deal of neutrons.

The target may be disposed generally horizontally or may be disposed vertically in use. Furthermore, an included angle between an axis of the target body reaction chamber and a horizontal plane is larger than 0 degree and less than or equal to 90 degrees.

Referring to FIG. 5, the target body is composed of the target body reaction chamber 11 and the solid particle 16. After the solid particles 16 are injected through the solid particle injection section 12, the primary spallation reaction and cascade reaction of the injected solid particles with the beam occur in the target body reaction chamber 11 to generate a great deal of neutrons. The beam scanning and security protecting device 15 of the target system is mounted to an upper end of the target body reaction chamber, and the beam scanning device can control a transverse distribution of the beam bombarding the solid particles, and performs beam scanning in a predetermined manner so that heat is distributed uniformly. The security protecting device is used for protection of the accelerator system. When gas leaks from the target body in an accidental operating condition, the pressurized gas will be led to the security protecting device through an inlet of the security protecting device. In the security protecting device, the gas is ionized and cooperates with an upper pressure difference system to protect the accelerator system effectively.

The beam scanning device is composed of a quadruple magnet system or a deflecting electrode system and can operate at a frequency from tens to hundreds Hz. In addition, the scanning frequency is improved as far as possible. The interface of the beam scanning device is connected to the security protecting device through a conduit. Material of the security protecting device is composed of high-temperature resistant solid material. The beam scanning and security protecting device is integrated.

Embodiment on High-power Beam Coupling Method

According to an embodiment, based on the accelerator-excited neutron generating device in the above embodiments, the present invention provides a high-power beam coupling method. The method comprises the steps of: injecting solid particles serving as a target body into a target body reaction chamber, and applying a beam to the solid particles.

The solid particles are circulated from an inside of the target body reaction chamber through an outside of the target body reaction chamber to the inside of the target body reaction chamber while the beam is applied to the solid particles. The solid particles which are being circulated and situated outside the target body reaction chamber may be processed. The processing comprises cooling the solid particles and selecting those of the solid particles that conform to a predetermined standard from the solid particles.

The present invention provides a high-power beam coupling method comprising the following steps.

At step S10, the solid particles serving as the target body enter the solid particle injection section through the buffer chamber and are injected into the reaction chamber from the injection section, for example, by gravity or pneumatically.

At step S20, nuclear reaction (primary spallation reaction and cascade reaction) of the solid particles with the beam occur in the target body reaction chamber to release a great deal of neutrons.

At step 30, high-power energy is deposited in the solid particles by the high-power beam.

At step 40, the solid particles in which the high-power energy is deposited are moved out of the reaction chamber through the solid particle discharge section and are conveyed to the heat exchange system for the solid particles so that the high-power deposited energy is also removed from the reaction chamber.

At step 50, in the heat exchange system for the solid particles, the high-power deposited energy is removed from the solid particles. Specifically, when the solid balls pass through the sorting system, the solid balls are cooled by gas so that the temperature of the solid balls is decreased. Furthermore, a liquid heat exchange system may also be disposed after the sorting system for further heat exchange so that the temperature of the solid particles can be reduced to a room temperature.

At step 60, before the solid particles are injected, the solid particles are inspected through the conveying device and the sorting system and are separated according to conditions, and the qualified solid particles are conveyed to the buffer chamber. Specifically, the cracked solid particles are screened out from the solid balls, discharged from the solid particle discharge section, through a horizontal mechanical conveying belt (or plate) having different holes, while the solid particles are cooled by gas. After that, the sorting and dust removing for the solid particles are further carried out through the screw conveyer and the pneumatic lift. Finally, the qualified solid particles are conveyed into the buffer chamber at the upper end of the target system through a continuous mechanical lift.

With the above circulating process, the accelerator-excited neutron generating device can be coupled with the high-power beam. The circulating speed is determined by the beam power and the rate of heat exchange. The more the beam power, the more the circulating speed. Referring to the above device embodiment and the description relevant to FIGS. 1-5 for the structure and characteristic of the accelerator-excited neutron generating device, they are not described here again for the purpose of brevity.

The above high-power beam coupling method mainly comprises the steps of injecting the solid particles into the reaction chamber (the target body reaction chamber) through the injection section (the solid particle injection section); generating neutrons by reaction of the solid particles of the target body with the beam; moving the solid particles in which high-power energy is deposited from the reaction chamber through the discharge section (the solid particle discharge section); and removing the high-power energy from the solid particles through a heat exchange system. The beam input conduit (the proton beam input conduit) is an input channel for the accelerator beam. The security protecting device can prevent leakage of pressurized gas in the direction of the accelerator in an accidental state of the accelerator-excited neutron generating device. The off-line processing of the accelerator-excited neutron generating device enables a system including the accelerator-excited neutron generating device to be maintained conveniently and components of the system to have a high technical maturity in the commercial manufacture, thereby reducing difficulty in manufacturing and application of the accelerator-excited neutron generating device.

As described above, the accelerator-excited neutron generating device and the high-power beam coupling method according to the above embodiments of the present invention can be applied in the application field of accelerator neutron source, such as a nuclear power energy source system (including transmutation of nuclear waste and breeding of nuclear material), production of isotopes, treating of cancer with neutrons, and irradiation of material. The accelerator-excited neutron generating device and the beam coupling method have the characteristic of off-line processing. For the application with strict radioactivity requirements, tungsten or tungsten alloy may be selected for the material of the solid particles. With the simple off-line processing, simple operational maintenance can be achieved. For the application with low radioactivity requirements, uranium, a uranium alloy, uranium ceramics, thorium, a thorium alloy, or thorium ceramics may be selected for the material of the solid particles. In this case, facility for operational maintenance of the neutron generating device will be complicated. The off-line processing also helps to reduce complicacy.

The accelerator-excited neutron generating device and the high-power beam coupling method according to the above embodiments of the present invention have been proposed for the difficult problems such as limiting factors on heat exchange and proportionality coefficient between cooling medium and solid target material in the existing solid target device; and corrosion of the target due to high-temperature liquid metals, damage of structural material of a beam window, stability of two-phase fluid, and difficulty in retaining vacuum of an accelerator beam conduit, which are confronted with by the liquid target. The present invention provides a spallation neutron generating device (accelerator-excited neutron generating device) which is operable under the action of a high-power beam. The accelerator-excited neutron generating device also improves the life time of the target device under the action of a high-power beam. The accelerator-excited neutron generating device is simple in structure, its components are technically mature in the industry, and difficulty in manufacturing the components is greatly reduced. The actual application of the accelerator-excited neutron generating device to a relevant field can be developed.

It can be seen from the above contents that in the present invention, a target device for a neutron generating device is configured to include a plurality of solid particles serving as a target body; and a target body reaction chamber for accommodating the solid particles. Thereby, the target body of the target device can be conveniently replaced.

In addition, the solid particles are circulated from an inside of the target body reaction chamber through an outside of the target body reaction chamber to the inside of the target body reaction chamber. As a result, the processing of the solid particles such as cooling, inspection and screening of the solid particles can be performed outside the target body reaction chamber.

In addition to the above structures, the present invention can adopt any other appropriate conveying devices such as devices for conveying bulk material and articles and industrial robots, any other appropriate cooling devices such as devices for cooling work pieces in the industry, and any other appropriate inspection devices. Therefore, the present invention is not limited to the above embodiments.

It should be noted that the above embodiments are only preferable embodiments of the present invention, and the present invention is not limited to the present invention. While the present invention has been described in detail with reference to the above embodiments, it will be understood by those skilled in the art that modifications to the technical solutions of the above embodiments, or equivalent substitutions for some of the technical features of the above embodiments may be made. All of the modifications, equivalent substitutions and improvements made without departing from the principles and spirit of the present invention should fall within the protection scope of the present invention.

What is claimed is:

1. A target device for a neutron generating device, comprising:
   a plurality of solid particles serving as a target body; and
   a target body reaction chamber configured for accommodating the plurality of solid particles such that the solid particles are discharged from the target body reaction chamber by gravity,
   wherein the solid particles accommodated in the target body reaction chamber are configured to generate neutrons when a beam is applied to the solid particles,
   wherein the target body reaction chamber has an injection conduit defining an injection opening and a discharge conduit defining a discharge opening, and the solid particles are injected into the target body reaction chamber through the injection opening and moved out of the target body reaction chamber through the discharge opening, and
   wherein a ratio of a diameter of the target body reaction chamber to a particle diameter of the plurality of solid particles is in a range of 5:1-30:1.

2. The target device of claim 1, wherein
   the solid particles have at least one of a spherical shape, an ellipsoidal shape, and a polyhedral shape.

3. The target device of claim 1, wherein the solid particle comprises anyone of tungsten, a tungsten alloy, uranium, a uranium alloy, uranium ceramics, thorium, a thorium alloy, and thorium ceramics.

4. An accelerator-excited neutron generating device comprising:
   the target device according to claim 1; and
   a solid particle conveying device for injecting the solid particles into the target body reaction chamber.

5. The accelerator-excited neutron generating device of claim 4, further comprising:
   a cooling device, wherein the solid particles are cooled by the cooling device after the solid particles are moved out of the target body reaction chamber, and then the solid particles are injected into the target body reaction chamber by the solid particle conveying device.

6. The accelerator-excited neutron generating device of claim 4, further comprising:
   a sorting device configured such that those of the solid particles that conform to a predetermined standard are selected from the solid particles by the sorting device after the solid particles are moved out of the target body reaction chamber, and then injected into the target body reaction chamber.

7. The accelerator-excited neutron generating device of claim 4, wherein
   the solid particles have at least one of a spherical shape, an ellipsoidal shape, and a polyhedral shape.

8. The accelerator-excited neutron generating device of claim 4, further comprising: a buffer chamber disposed at a solid particle injection opening for temporarily storing the solid particles.

9. The accelerator-excited neutron generating device of claim 4, wherein
   the solid particle conveying device is configured to circulate the solid particles from an inside of the target body reaction chamber through an outside of the target body reaction chamber to the inside of the target body reaction chamber while the beam is applied to the solid particles.

10. The accelerator-excited neutron generating device of claim 9, further comprising: a cooling device and a sorting device, wherein the solid particles which are being circulated and situated outside the target body reaction chamber are cooled by the cooling device, and those of the solid particles that conform to a predetermined standard are selected by the sorting device from the solid particles which are being circulated and situated outside the target body reaction chamber.

11. A beam coupling method for the accelerator-excited neutron generating device according to claim 4, comprising:
    injecting the solid particles serving as the target body into the target body reaction chamber, and
    applying a beam to the solid particles.

12. The beam coupling method of claim 11, wherein the solid particles are circulated from an inside of the target body reaction chamber through an outside of the target body reaction chamber to the inside of the target body reaction chamber while the beam is applied to the solid particles.

13. The beam coupling method of claim 12, wherein the solid particles which are being circulated and situated outside the target body reaction chamber are processed.

14. The beam coupling method of claim 13, wherein the processing comprises cooling the solid particles and selecting those of the solid particles that conform to a predetermined standard from the solid particles.

15. The target device of claim 1, wherein a ratio of a caliber of the injection conduit to the diameter of the target body reaction chamber is in a range of 1:1-1:10.

16. The target device of claim 1, wherein a ratio of a caliber of the discharge conduit to the diameter of the target body reaction chamber is in a range of 1:1-1:10.

* * * * *